United States Patent [19]

Devilleger et al.

[11] Patent Number: 4,848,401
[45] Date of Patent: Jul. 18, 1989

[54] ISOLATION CHAMBER VALVE

[75] Inventors: Denis Devilleger, Thoiry; Jean-Yves Le Gac, Beynes, both of France

[73] Assignee: Gaz de France, Paris, France

[21] Appl. No.: 116,808

[22] Filed: Nov. 5, 1987

[30] Foreign Application Priority Data

Nov. 14, 1986 [FR] France ............................ 86 15868

[51] Int. Cl.⁴ ............................................ F16K 39/00
[52] U.S. Cl. .................................... 137/599; 137/901; 251/254
[58] Field of Search ................ 137/599, 901; 251/254, 251/276

[56] References Cited

U.S. PATENT DOCUMENTS

| | | | |
|---|---|---|---|
| 275,300 | 4/1883 | Webb | 251/254 |
| 1,378,030 | 5/1921 | Hay | 137/901 X |
| 1,648,986 | 11/1927 | Gray | 137/599 |
| 1,697,608 | 1/1929 | Patterson | 137/599 X |
| 2,726,672 | 12/1955 | Doster | 137/599 X |
| 2,819,034 | 1/1958 | Holderer . | |
| 2,959,187 | 11/1960 | Boyle . | |
| 3,135,284 | 6/1964 | Magos | 137/599 |

FOREIGN PATENT DOCUMENTS

| | | | |
|---|---|---|---|
| 322388 | 7/1918 | Fed. Rep. of Germany | 137/599 |
| 611522 | 9/1926 | France . | |
| 653141 | 3/1929 | France . | |
| 985053 | 7/1951 | France . | |
| 232689 | 3/1966 | U.S.S.R. | 137/599 |
| 311576 | 5/1929 | United Kingdom | 137/599 |
| 574756 | 1/1946 | United Kingdom . | |

Primary Examiner—Robert G. Nilson
Attorney, Agent, or Firm—Pollock, VandeSande & Priddy

[57] ABSTRACT

The invention relates to an isolation chamber valve. The isolation chamber valve of the invention includes, for connecting its inlet passage and its outlet passage, a by-pass circuit of small section comprising at least a flap the opening and closing of which can be controlled as required. This isolation chamber valve is used in particular in the operation of shafts for deposits or the storage of gas or other fluids under pressure.

3 Claims, 4 Drawing Sheets

ISOLATION CHAMBER VALVE

FIELD OF THE INVENTION

The invention relates to an improved isolation chamber valve in particular for use for deposit shafts or storage installations for gas or other fluids under pressure.

BACKGROUND OF THE INVENTION

Generally speaking an operation such as for example the positioning of working tools in a shaft under pressure requires the use of an introduction or withdrawal isolation chamber which must be connected to the head of the shaft. For this purpose the upper part of the head of the shaft is provided with an isolation chamber valve designed to enable the isolation chamber to be connected or isolated in relation to the shaft.

Isolation chamber valves may in particular be of the ball type, although these valves are not always suitable for the use for which they are intended.

It should be noted in particular that wear occurs on the sealing joints of the valve.

In fact when the isolation chamber valve is in the closed position, there are different pressures on either side of the valve ball. This difference in pressure is generally speaking very high and the operation of the ball, particularly when the valve is open becomes all the more difficult as it is necessary to avoid jumps in pressure so as not to damage the working tools it is desired to position in the shaft.

When it is operated, the valve ball is controlled by rotation and this causes a throttling of the flow of the fluid resulting in the serious deterioration of the sealing components. Consequently, repairs of varying frequency are required according to the frequency of operation of the valve.

BRIEF DESCRIPTION OF THE INVENTION

The object of the invention is to solve these problems so as to effect a significant reduction in the frequency of repairs to the valve.

For this purpose the improved isolation chamber valve proposed in the invention is such that it includes a small section by-pass circuit connecting its inlet and outlet passage which is provided with at least a flap, the opening and closing of which can be controlled as required.

In this way, it is possible in particular before the valve is opened to reduce and even to eliminate the difference in the pressures upstream and downstream of the valve which has the effect of eliminating the throttling of the flow of gas and results in a considerable improvement in the resistance of the sealing components.

According to an additional characteristic of the invention, the flap of the valve is controlled positively on opening when it comes up against the action of a flexible return component which normally holds it in the closed position. In this way if the controlling force of the flap on opening is cancelled, the flap is pushed back into the closed position; this feature constitutes a very appropriate safety measure.

Provision is also made according to the invention for the by-pass circuit of the valve to include at least an adjustable leakage flow component of the needle or similar type. In this way the reduction in the difference in pressures and the balancing of these pressures is effected without abrupt changes.

This component also provides additional safety by a second closing of the by-pass circuit.

The various advantages and characteristics of the invention will be seen more clearly from the following description with reference to the accompanying drawings in which:

DETAILED DESCRIPTION OF THE INVENTION

Figure 1:
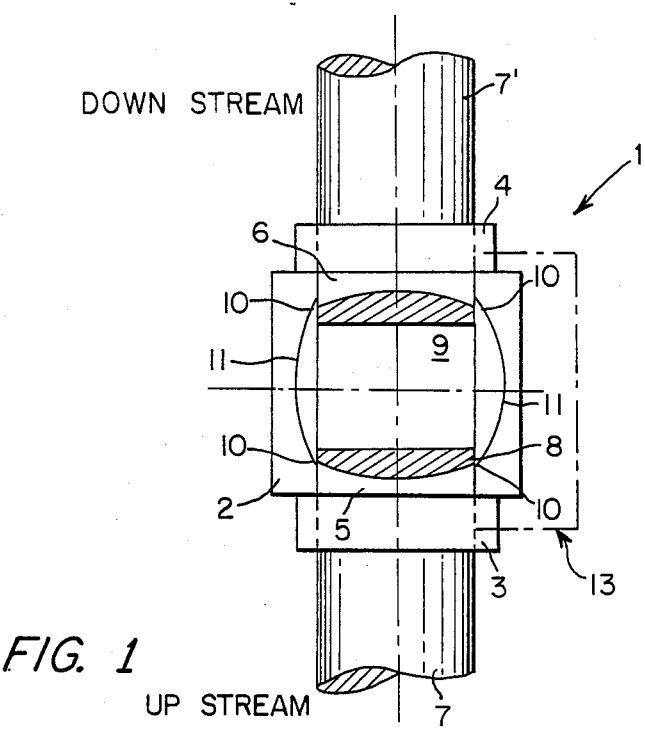
FIG. 1 shows a part sectional schematic top view of a conventional isolation chamber valve in the closed position to which has been added the by-pass circuit of the invention shown as a dot - dash line.

If reference is made first of all to FIG. 1, a conventional isolation chamber valve 1 will be seen comprising a body 2 provided with an inlet flange 3 and an outlet flange 4 connecting respectively the inlet passage 5 and the outlet passage 6 of the valve to two sections 7 and 7' of the operating conduit of the shaft on which work is being carried out (not shown).

The isolation chamber valve is opened and closed by a component 8 of, for example, the type with a "ball" pierced by a traversing orifice 9.

All other types of valve apart from the "ball" type may be used provided they are adapted for the application in question.

As will be seen from the figure, the ball 8 which is of substantially spherical shape operates in conjunction with a bearing surface 11 formed on the body 2 of the valve which is also substantially spherical.

The system is sealed by means of the joints identified by 10. FIG. 1 shows the valve in the closed position. In other words, in this position the external walls of the ball 8 block the connection between the inlet passage 5 and the outlet passage 6 of the valve. The fluid under pressure is no longer able to flow therefore downstream of valve 1.

Figure 2:
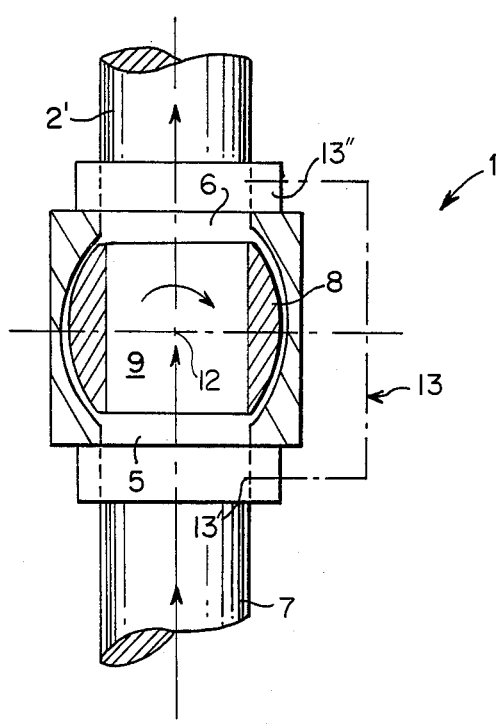
FIG. 2 shows the same isolation chamber valve but in the open position.

FIG. 2 on the other hand shows the valve 1 in the open position. The change from the closed to the open position of the valve is carried out by swivelling the ball 8 substantially a quarter of a turn about the axis 12 identified by a point on FIG. 2. This rotation is indicated by an arrow.

In the open position the orifice 9 of the ball opens out towards its two opposite ends on the inlet passage 5 and the outlet passage 6.

The fluid under pressure, for example, gas can then flow through the connection orifice 9 between the section 7 and the section 7' of the conduit.

FIG. 2 shows the direction of flow of the fluid under pressure by means of arrows.

FIGS. 1 and 2 also show schematically and with dot-dash lines the improvement provided by the invention which consists of a by-pass circuit 13 for the fluid under pressure which is liable to circulate through the valve. This by-pass circuit is for preference of relatively small section in relation to that of sections 7 and 7' and the connection orifice 9 and opens out on one side at the inlet passage 5 and on the other to the outlet passage 6 of the valve.

Figure 3:
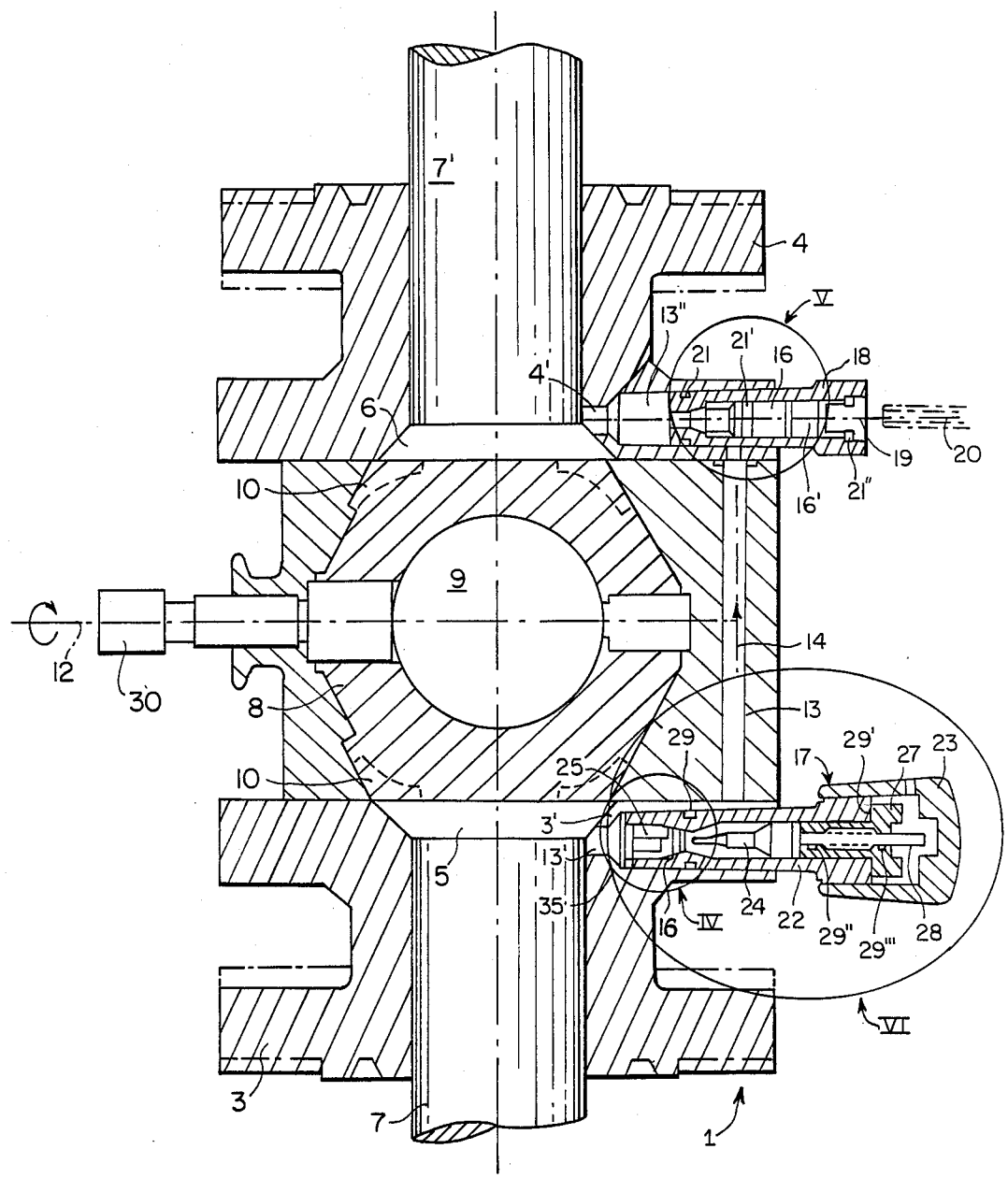
FIG. 3 shows a sectional and schematic front view of the isolation chamber valve of the invention.

FIG. 3 shows in greater detail the improved isolation chamber valve of the invention. This figure shows in addition to the body 2 of the valve, inside which is arranged the adjusting ball 8 which is holed (at 9) and the upstream flange 3 and downstream flange 4 connecting the inlet passage 5 and outlet passage 6 respectively to sections 7 and 7' of the conduit, a clear view of the bypass circuit 13.

This circuit 13 includes in the direction of flow of the gas under pressure (shown by the arrow 14) a flap 15, the opening and closing of which can be effected as desired and for preference an adjustable leakage flow component 16 of the needle or similar type.

The part of the by-pass circuit 13 located between the flap 15 and the needle 16 may in particular be arranged in the body 2 of the valve, whereby its ends 13' and 13" open out at the internal wall 3' and 4' of each of the flanges 3 and 4 respectively.

The needle 16 is, as shown, incorporated in a body 18 which is for example accommodated in an interacting part of the downstream flange 4 of the valve and includes a shaped part 16' opening out onto an orifice 19 formed on the body 18 in such a way that it is able to receive the head of a key 20 for adjusting the leakage flow of the fluid under pressure which can flow in the by-pass circuit 13.

The assembly is sealed with joints 21 and 21' and joint 21" prevents the needle 16 from leaving the body 18 after unscrewing has taken place.

As far as the flap 15 is concerned it can be incorporated into a control component, identified as 17, forming for example an actuating component of the "blow" type arranged in a body 22 extending into a fixed interacting part of the upstream flange 3 of the valve.

Figure 4:
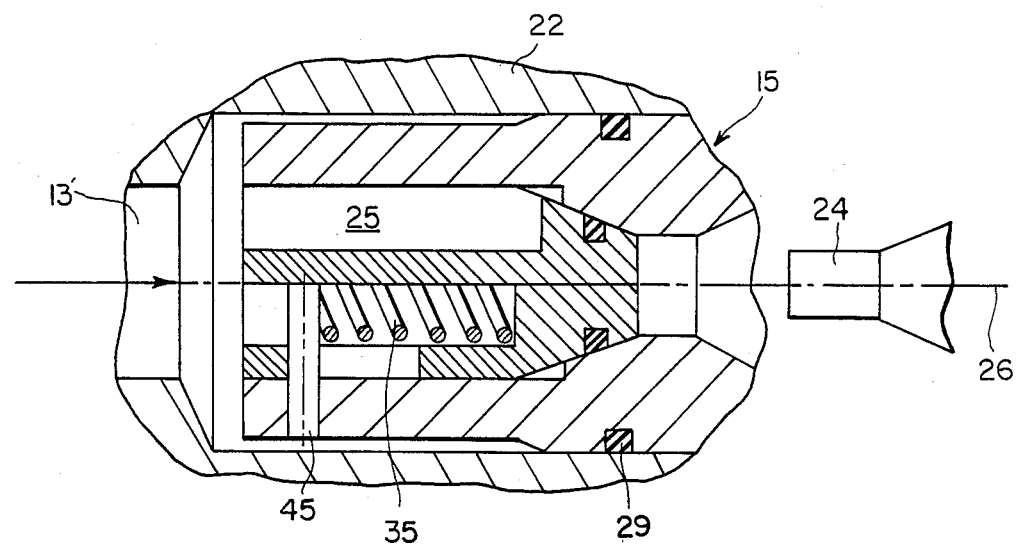
FIG. 4 shows an enlarged view of detail IV of FIG. 3.

The "blow" controlling component 17 includes an operating cover 23 fitted on the body 22 and acting on a pushrod 24, guided by a component 27 against the action of a spring 28 and controlling the flap 15, whereby this flap includes, as shown in greater detail in FIG. 4, a countersunk part 25 for the flow of the fluid under pressure and a spring 35 for holding the flap 15 in the closed position and whereby this spring acts when it comes up against the action of the push rod 24. A pin 45 or an equivalent part prevents the rotation of the flap 15 while allowing its translational movement substantially in the axis 26 of the control component 17.

The assembly is sealed with joints 29, 29', 29" and 29'''.

The operation of the improved isolation chamber valve of the invention will now be described.

This improved valve is shown in the closed position in FIG. 3 (see also FIG. 1). The ball 8 blocks the connection between the inlet passage 5 and the outlet passage 6 of the valve, thus isolating section 7 which is subjected to the pressure obtained in the shaft of section 7' which is then subjected to atmospheric pressure.

The flap 15 is also in the closed position and held in that position by the spring 35 and the pressure of the shaft.

No fluid will circulate therefore in the by-pass circuit 13.

For preference needle 16 is then adjusted (by means of key 20) so as to permit the possible flow of a desired leakage flow of the fluid under pressure.

In the known "ball" isolation chamber valves, i.e. those without a by-pass circuit, the valve is opened as has already been mentioned by operating the ball 8 by rotating it about the axis 12 by substantially a quarter of a turn using an operating button or square 30.

However this operation for opening the valve which generally causes serious throttling of the flow of fluid under pressure which then flows into the conduit, results over a shorter or longer period in a significant deterioration in the sealing joints 10. It should be noted by way of example that the difference in pressure obtained on one or the other side of the valve ball may vary between 40 bars and more than 200 bars according to the deposit or storage facility. This is why provision has been made in the invention for reducing and then substantially equalizing the pressures on either side of this ball before the valve is opened at all.

For this purpose pressure is applied to the cover 23 of the "blow" controlling component 17 which causes the translational movement in the axis 26 of the pushrod 24 which positively controls the opening of flap 15 when it comes up against spring 35 and the pressure of the shaft. The fluid under pressure may then flow across the countersunk part 25 of the flap in the bypass circuit 13 towards the needle 16 (which is still set to allow the desired leakage flow) and thus opens out at the internal wall 4' of the downstream flange 4 in the outlet passage 6 of the valve. In this way as the ball 8 is still in the closed position, the pressures upstream and downstream of it are gradually equalized thus facilitating the operation for opening the valve and significantly reducing the disadvantages of conventional isolation chamber valves.

As soon as a check has confirmed that the pressures on either side of the ball 8 are substantially equal, the pressure applied to the cover 23 is released. The pushrod 24 is then separated from its support on the flap 15 by the action of the spring 28, whereby the flap returns to the closed position by the action of its spring 35. The fluid under pressure is then no longer able to circulate in the by-pass circuit 13.

At the same time the ball 8 has been moved towards its opening position so as to allow the fluid contained in the shaft to flow again.

Figure 5:
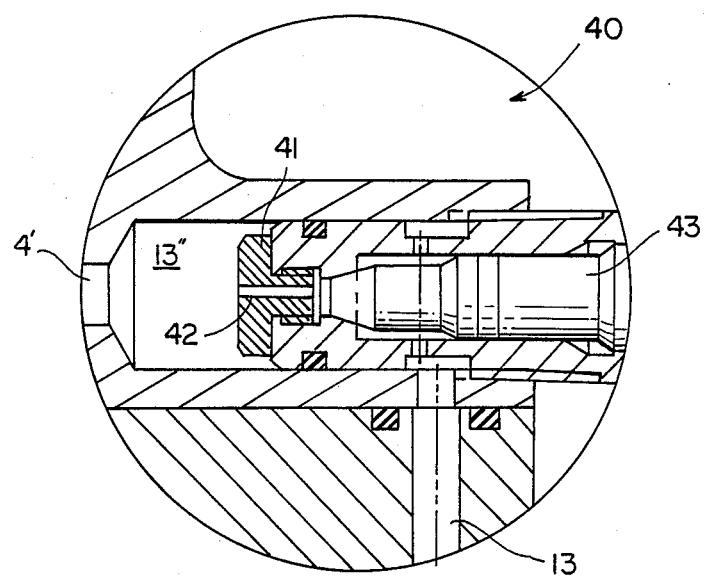
FIGS. 5 and 6 show enlarged details relating to two constructional variants of components of the valve arranged at surrounded positions V and VI in FIG. 3.

According to the detail variant shown in FIG. 5 the adjusting component for the leakage flow identified generally by 16 in FIG. 3 is replaced by a leakage flow component of greater precision identified as a whole by 40 and comprising essentially a component 41 formed with a calibrated orifice 42 through which opens out the end of the outlet of the passage 13 (towards the end 13" and the outlet 4', of the by-pass). The calibrated passage 42 is advantageously controlled by an opening/closing component such as a needle valve tap 43 which may be similar to the needle component 16 already described in FIG. 3.

This arrangement has the advantage that a leakage flow which is perfectly controlled and determined by the calibrated orifice 42 is always obtained, while the needle valve tap 43 is simply used to control the existence of this leakage flow or to block it.

Figure 6:
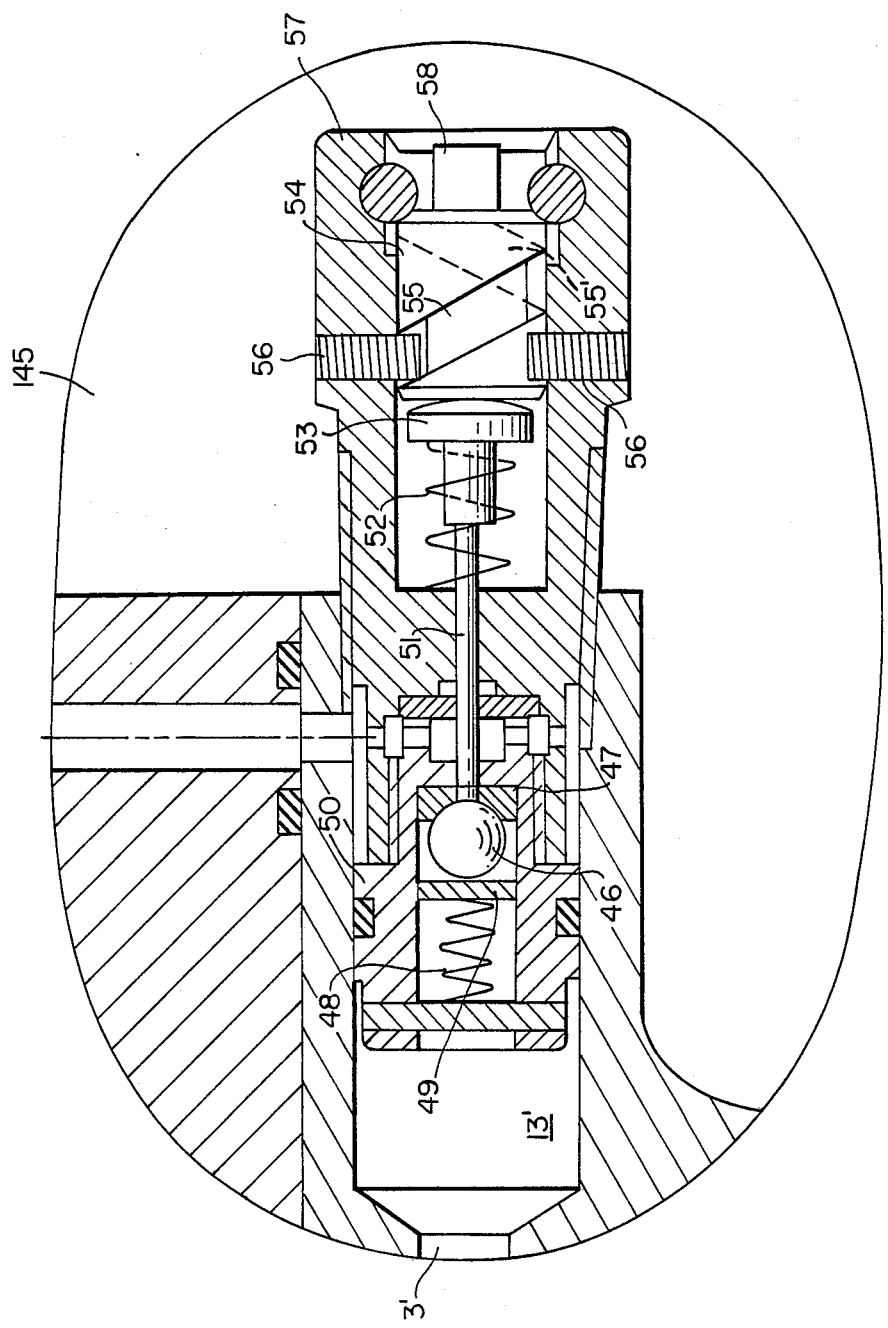

According to the detail variant illustrated in FIG. 6, instead of the flap identified as a whole by 15 in FIG. 3, a more advanced flap identified as a whole by 145 is used which comprises basically a flap of the ball type 46 pressed onto its seat 47 by means of a spring 48 which controls the by-pass inlet wall 3' and end 13'. The spring 48 acts on the ball 46 by means of a washer 49 in which holes are drilled, whereby the whole assembly is fitted with suitable sealing joints inside a sleeve 50 in the end 13′.

The ball valve 46 is opened with the aid of a pushrod 51 which is normally withdrawn to the rear by a spring 52 acting under the head 53 of the rod 51. The thrust of the pushrod 51 (to open the flap 46–47) is controlled by the control of a piston 54 in rotation which is provided on its periphery with two helicoidal ramps 55 and 55′ with which two pins 56 and 56′ engage which are fixed in the wall of the cylinder 57 which receives the piston 54. Rotation is effected by means of a key (not shown) acting on the suitably shaped end with faces 58 which can be reached from the outside of the piston 54.

This arrangement has the advantage of facilitating the operation for opening the by-pass in particular in the case of drillings or deposits under very high pressure and for which the opening of the valve by simple pressure ("with a blow") in the manner illustrated and described in FIG. 3 may prove unsuitable.

It should be noted that the flap 145 returns for safety reasons in the same way as the "blow" flap 15 illustrated in FIG. 3, automatically to its closed position when pressure is no longer applied to it.

What is claimed:

1. In an isolation chamber valve for use with pressurized fluids and having a main first valve member, a fluid bypass circuit connected between an inlet and outlet of the first valve member comprising:

a normally closed second valve element located in a fluid line of small cross sections, said second valve element comprising a ball and a seat for said ball;

valve operating means for selectably opening the second valve element to allow fluid flow through the bypass circuit, thereby equalizing pressure across the inlet and outlet, said valve operating means comprising a push rod adapted to move said ball from its seat, a piston member contacting said push rod and having a helical groove formed therein which is coaxial with the push rod, and a cylindrical housing having internal pin means for engaging said groove and converting rotational motion of said piston to translational motion of said push rod and said ball; and means located in the fluid line for controlling the flow therethrough.

2. The structure set forth in claim 1 together with an inlet flange and an outlet flange connected to said first valve, said flanges including:

first internal openings to respectively serve as said inlet and said outlet of said valve; and second internal openings smaller than said first internal openings to provide direct communication between said fluid bypass circuit and said inlet and said outlet.

3. The structure set forth in claim 1 wherein the main first valve member is of the ball type.

* * * * *